United States Patent
Gupta et al.

(10) Patent No.: US 12,068,979 B2
(45) Date of Patent: Aug. 20, 2024

(54) SYSTEM AND METHOD FOR DIVIDING A PHYSICAL ETHERNET PORT

(71) Applicant: EMC IP Holding Company, LLC, Hopkinton, MA (US)

(72) Inventors: Mukesh Gupta, Shrewsbury, MA (US); Daniel E. Cummins, Hudson, NH (US)

(73) Assignee: EMC IP Holding Company, LLC, Hopkinton, MA (US)

( * ) Notice: Subject to any disclaimer, the term of this patent is extended or adjusted under 35 U.S.C. 154(b) by 384 days.

(21) Appl. No.: 16/864,651

(22) Filed: May 1, 2020

(65) Prior Publication Data

US 2021/0344619 A1    Nov. 4, 2021

(51) Int. Cl.
| | |
|---|---|
| G06F 9/46 | (2006.01) |
| G06F 9/455 | (2018.01) |
| G06F 9/50 | (2006.01) |
| H04L 12/46 | (2006.01) |
| H04L 41/0896 | (2022.01) |
| H04L 49/00 | (2022.01) |

(52) U.S. Cl.
CPC .......... H04L 49/70 (2013.01); G06F 9/45558 (2013.01); G06F 9/5077 (2013.01); H04L 12/4641 (2013.01); H04L 41/0896 (2013.01); G06F 2009/45595 (2013.01)

(58) Field of Classification Search
CPC . H04L 49/70; H04L 12/4641; H04L 41/0896; G06F 9/45558; G06F 9/5077; G06F 2009/45595
USPC ........................................................ 718/104
See application file for complete search history.

(56) References Cited

U.S. PATENT DOCUMENTS

| | | | |
|---|---|---|---|
| 8,824,485 B2* | 9/2014 | Biswas | H04L 12/4641 370/530 |
| 9,160,644 B1* | 10/2015 | Soffer | H04L 43/50 |
| 9,258,253 B2* | 2/2016 | Subramanian | H04L 49/356 |
| 9,407,500 B2* | 8/2016 | Janardhanan | H04L 45/245 |
| 2002/0123365 A1* | 9/2002 | Thorson | H04W 88/08 455/524 |
| 2010/0017496 A1* | 1/2010 | Kimmel | G06F 12/0868 709/215 |
| 2010/0290467 A1* | 11/2010 | Eisenhauer | H04L 41/12 370/392 |
| 2012/0131232 A1* | 5/2012 | Brownlow | G06F 13/4221 710/10 |

(Continued)

OTHER PUBLICATIONS

Mike "An In-depth Look at SR-IOV NIC Passthrough", vswitchzero, Jun. 19, 2019 (Year: 2019).*

(Continued)

*Primary Examiner* — Bradley A Teets
(74) *Attorney, Agent, or Firm* — Brian J. Colandreo; Heath M. Sargeant; Holland & Knight LLP

(57) ABSTRACT

A method, computer program product, and computer system for dividing a physical Ethernet port is provided. The method may include dividing, by a computing device, a first physical Ethernet port of a plurality of physical Ethernet ports into a plurality of partitions. A first partition of the plurality of partitions for the first Ethernet port may be assigned to a N-virtual distributed switch. A second partition of the plurality of partitions for the first Ethernet port may be assigned with a plurality of functions. Ethernet packets may be switched between the plurality of functions in the second partition.

15 Claims, 5 Drawing Sheets

(56) References Cited

U.S. PATENT DOCUMENTS

2012/0287787 A1* 11/2012 Kamble .................. H04L 49/70
                                                    370/235
2020/0037267 A1*  1/2020 Gray ................... H04W 52/283
2020/0204657 A1*  6/2020 Khan ...................... G06F 13/28

OTHER PUBLICATIONS

"What are Routing and Switching", OmniSecu, Nov. 24, 2013 (Year: 2013).*
"Network Interface Controller", Wikipedia, Apr. 2, 2019 (Year: 2019).*
"QLogic FastLinQ 3400 Series", 2016 (Year: 2016).*

* cited by examiner

SYSTEM AND METHOD FOR DIVIDING A PHYSICAL ETHERNET PORT

BACKGROUND

There may be many storage solutions for a hyper-converged segment of a storage market that may get deployed in virtualized environments, such as vSphere from VMWare and Hyper-V from Microsoft. As compared to traditional IT infrastructure where storage, compute and networking are separate infrastructure components, potentially sold by separate vendors with interoperability and management challenges, hyper converged solutions are typically sold by a single vendor integrating storage, compute and networking into a single product and thereby avoiding interoperability issues and providing a consistent approach to infrastructure management.

BRIEF SUMMARY OF DISCLOSURE

In one example implementation, a method, performed by one or more computing devices, may include but is not limited to dividing, by a computing device, a first physical Ethernet port of a plurality of physical Ethernet ports into a plurality of partitions. A first partition of the plurality of partitions for the first Ethernet port may be assigned to a N-virtual distributed switch. A second partition of the plurality of partitions for the first Ethernet port may be assigned with a plurality of functions. Ethernet packets may be switched between the plurality of functions in the second partition.

One or more of the following example features may be included. A first function of the plurality of functions on the second partition may be a physical function assigned to a virtual distributed switch, and a second function of the plurality of functions on the second partition may be a virtual function assigned to a controller virtual machine. The physical function on the second partition and the virtual function on the second partition may be single root IO virtualization functions created on a single root IO virtualization enabled adapter. A symmetric configuration of the first physical Ethernet port may be created on a second physical Ethernet port of the plurality of physical Ethernet ports. Teaming policies may be formed by aggregating the first partition on the first physical Ethernet port and the first partition on the second physical Ethernet port. A loopback capability may be provided between the physical function and the virtual function of the second partition. Bandwidth allocation for the second partition may be subdivided between the physical function and the virtual function.

In another example implementation, a computing system may include one or more processors and one or more memories configured to perform operations that may include but are not limited to dividing, by a computing device, a first physical Ethernet port of a plurality of physical Ethernet ports into a plurality of partitions. A first partition of the plurality of partitions for the first Ethernet port may be assigned to a N-virtual distributed switch. A second partition of the plurality of partitions for the first Ethernet port may be assigned with a plurality of functions. Ethernet packets may be switched between the plurality of functions in the second partition.

One or more of the following example features may be included. A first function of the plurality of functions on the second partition may be a physical function assigned to a virtual distributed switch, and a second function of the plurality of functions on the second partition may be a virtual function assigned to a controller virtual machine. The physical function on the second partition and the virtual function on the second partition may be single root IO virtualization functions created on a single root IO virtualization enabled adapter. A symmetric configuration of the first physical Ethernet port may be created on a second physical Ethernet port of the plurality of physical Ethernet ports. Teaming policies may be formed by aggregating the first partition on the first physical Ethernet port and the first partition on the second physical Ethernet port. A loopback capability may be provided between the physical function and the virtual function of the second partition. Bandwidth allocation for the second partition may be subdivided between the physical function and the virtual function.

In another example implementation, a computer program product may reside on a computer readable storage medium having a plurality of instructions stored thereon which, when executed across one or more processors, may cause at least a portion of the one or more processors to perform operations that may include but are not limited to dividing, by a computing device, a first physical Ethernet port of a plurality of physical Ethernet ports into a plurality of partitions. A first partition of the plurality of partitions for the first Ethernet port may be assigned to a N-virtual distributed switch. A second partition of the plurality of partitions for the first Ethernet port may be assigned with a plurality of functions. Ethernet packets may be switched between the plurality of functions in the second partition.

One or more of the following example features may be included. A first function of the plurality of functions on the second partition may be a physical function assigned to a virtual distributed switch, and a second function of the plurality of functions on the second partition may be a virtual function assigned to a controller virtual machine. The physical function on the second partition and the virtual function on the second partition may be single root IO virtualization functions created on a single root IO virtualization enabled adapter. A symmetric configuration of the first physical Ethernet port may be created on a second physical Ethernet port of the plurality of physical Ethernet ports. Teaming policies may be formed by aggregating the first partition on the first physical Ethernet port and the first partition on the second physical Ethernet port. A loopback capability may be provided between the physical function and the virtual function of the second partition. Bandwidth allocation for the second partition may be subdivided between the physical function and the virtual function.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
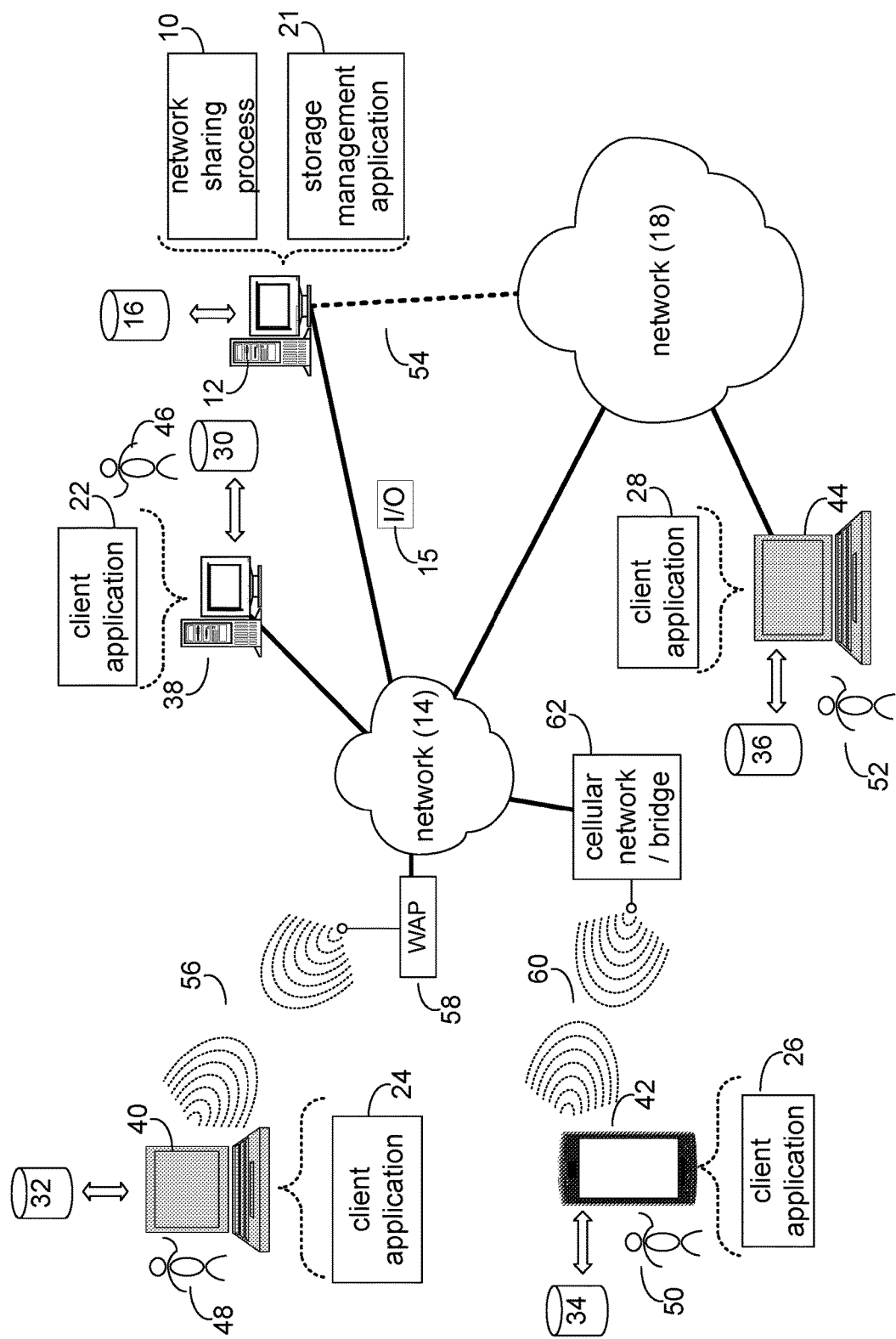
FIG. 1 is an example diagrammatic view of a network sharing process coupled to an example distributed computing network according to one or more example implementations of the disclosure.

System Overview:

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electro-magnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures (or combined or omitted). For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown network sharing process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer(s), or a computing cloud(s). As is known in the art, a SAN may include one or more of the client electronic devices, including a RAID device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a network sharing process, such as network sharing process 10 of FIG. 1, may divide, by a computing device, a first physical Ethernet port of a plurality of physical Ethernet ports into a plurality of partitions. A first partition of the plurality of partitions for the first Ethernet port may be assigned to a N-virtual distributed switch. A second partition of the plurality of partitions for the first Ethernet port may be assigned with a plurality of functions. Ethernet packets may be switched between the plurality of functions in the second partition.

In some implementations, the instruction sets and subroutines of network sharing process 10, which may be stored on storage device, such as storage device 16, coupled to computer 12, may be executed by one or more processors and one or more memory architectures included within computer 12. In some implementations, storage device 16 may include but is not limited to: a hard disk drive; all forms of flash memory storage devices; a tape drive; an optical drive; a RAID array (or other array); a random access memory (RAM); a read-only memory (ROM); or combination thereof. In some implementations, storage device 16 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some implementations, network 14 may be connected to one or more secondary networks (e.g., network 18), examples of which may include but are not limited to: a local area network; a wide area network or other telecommunications network facility; or an intranet, for example. The phrase "telecommunications network facility," as used herein, may refer to a facility configured to transmit, and/or receive transmissions to/from one or more mobile client electronic devices (e.g., cellphones, etc.) as well as many others.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, network sharing process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network.

In some implementations, computer 12 may execute a storage management application (e.g., storage management application 21), examples of which may include, but are not limited to, e.g., a storage system application, a cloud computing application, a data synchronization application, a data migration application, a garbage collection application, or other application that allows for the implementation and/or management of data in a clustered (or non-clustered) environment (or the like). In some implementations, network sharing process 10 and/or storage management application 21 may be accessed via one or more of client applications 22, 24, 26, 28. In some implementations, network sharing process 10 may be a standalone application, or may be an applet/application/script/extension that may interact with and/or be executed within storage management application 21, a component of storage management application 21, and/or one or more of client applications 22, 24, 26, 28. In some implementations, storage management application 21 may be a standalone application, or may be an applet/application/script/extension that may interact with and/or be executed within network sharing process 10, a component of network sharing process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of network sharing process 10 and/or storage management application 21. Examples of client applications 22, 24, 26, 28 may include, but are not limited to, e.g., a storage system application, a cloud computing application, a data synchronization application, a data migration application, a garbage collection application, or other application that allows for the implementation and/or management of data in a clustered (or non-clustered) environment (or the like), a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet, a server, a television, a smart television, a smart speaker, an Internet of Things (IoT) device, a media (e.g., video, photo, etc.) capturing device, and a dedicated network device. Client electronic devices 38, 40, 42, 44 may each execute an operating system, examples of which may include but are not limited to, Android™, Apple® iOS®, Mac® OS X®; Red Hat® Linux®, Windows® Mobile, Chrome OS, Blackberry OS, Fire OS, or a custom operating system.

In some implementations, one or more of client applications 22, 24, 26, 28 may be configured to effectuate some or all of the functionality of network sharing process 10 (and vice versa). Accordingly, in some implementations, network sharing process 10 may be a purely server-side application, a purely client-side application, or a hybrid server-side/client-side application that is cooperatively executed by one or more of client applications 22, 24, 26, 28 and/or network sharing process 10.

In some implementations, one or more of client applications 22, 24, 26, 28 may be configured to effectuate some or all of the functionality of storage management application 21 (and vice versa). Accordingly, in some implementations, storage management application 21 may be a purely server-side application, a purely client-side application, or a hybrid server-side/client-side application that is cooperatively executed by one or more of client applications 22, 24, 26, 28 and/or storage management application 21. As one or more of client applications 22, 24, 26, 28, network sharing process 10, and storage management application 21, taken singly or in any combination, may effectuate some or all of the same functionality, any description of effectuating such functionality via one or more of client applications 22, 24, 26, 28, network sharing process 10, storage management application 21, or combination thereof, and any described interaction(s) between one or more of client applications 22, 24, 26, 28, network sharing process 10, storage management application 21, or combination thereof to effectuate such functionality, should be taken as an example only and not to limit the scope of the disclosure.

In some implementations, one or more of users 46, 48, 50, 52 may access computer 12 and network sharing process 10 (e.g., using one or more of client electronic devices 38, 40, 42, 44) directly through network 14 or through secondary network 18. Further, computer 12 may be connected to network 14 through secondary network 18, as illustrated with phantom link line 54. Network sharing process 10 may include one or more user interfaces, such as browsers and textual or graphical user interfaces, through which users 46, 48, 50, 52 may access network sharing process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some implementations, various I/O requests (e.g., I/O request 15) may be sent from, e.g., client applications 22, 24, 26, 28 to, e.g., computer 12. Examples of I/O request 15 may include but are not limited to, data write requests (e.g., a request that content be written to computer 12) and data read requests (e.g., a request that content be read from computer 12).

Figure 2:
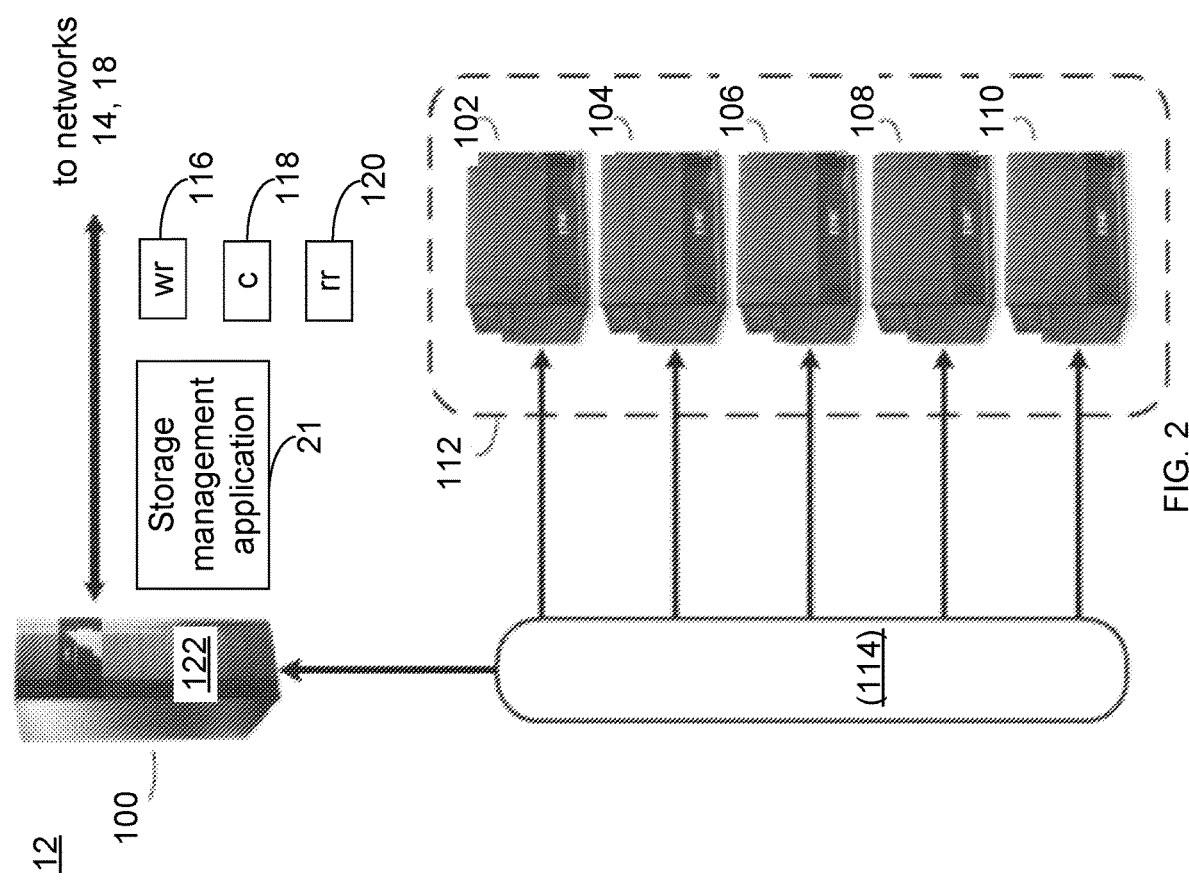
FIG. 2 is an example diagrammatic view of a storage system of FIG. 1 according to one or more example implementations of the disclosure.
Figure 3:
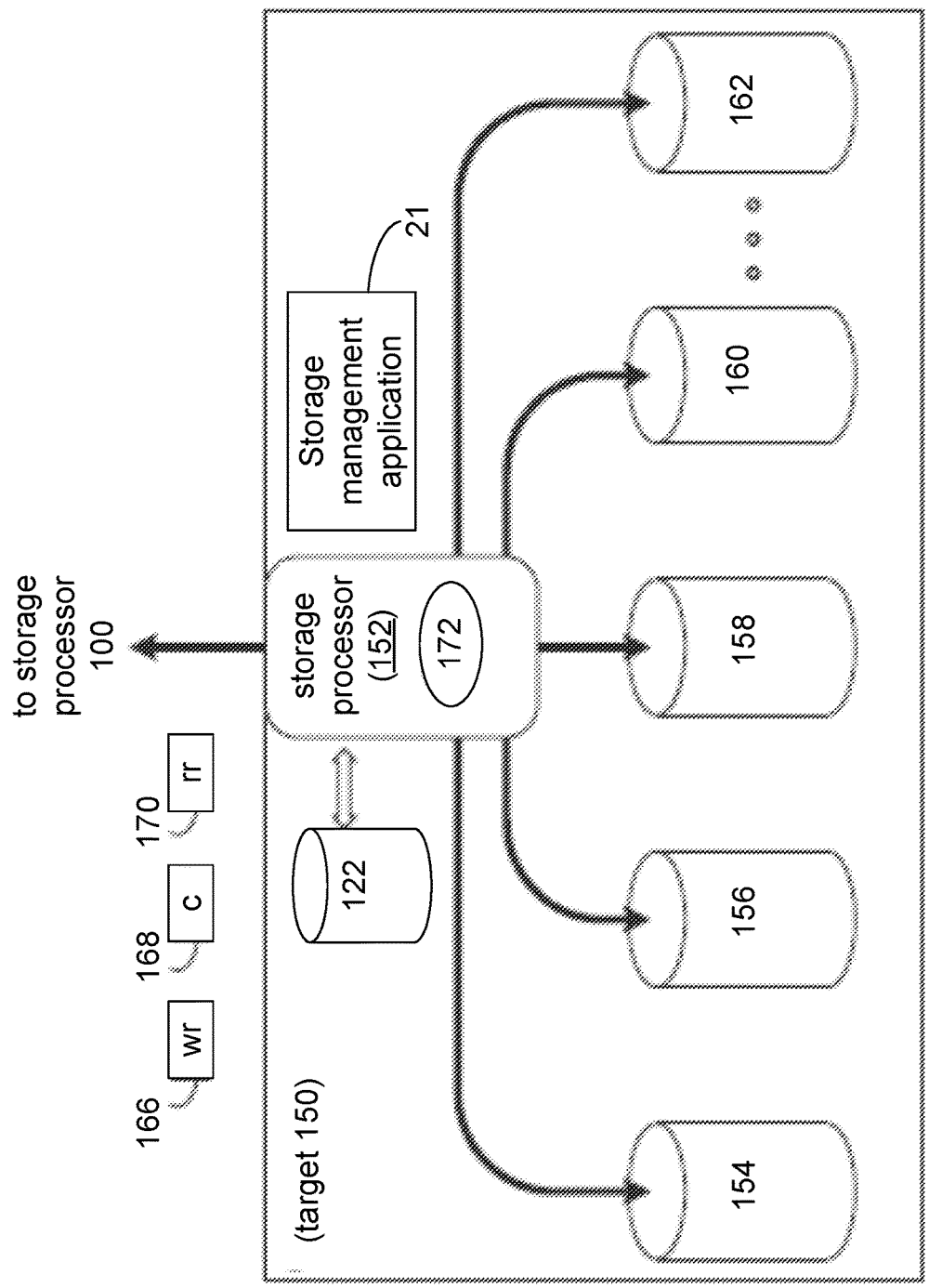
FIG. 3 is an example diagrammatic view of a storage target of FIG. 1 according to one or more example implementations of the disclosure.

Data Storage System:

Referring also to the example implementation of FIGS. 2-3 (e.g., where computer 12 may be configured as a data storage system), computer 12 may include storage processor 100 and a plurality of storage targets (e.g., storage targets 102, 104, 106, 108, 110). In some implementations, storage targets 102, 104, 106, 108, 110 may include any of the above-noted storage devices. In some implementations, storage targets 102, 104, 106, 108, 110 may be configured to provide various levels of performance and/or high availability. For example, storage targets 102, 104, 106, 108, 110 may be configured to form a non-fully-duplicative fault-tolerant data storage system (such as a non-fully-duplicative RAID data storage system), examples of which may include but are not limited to: RAID 3 arrays, RAID 4 arrays, RAID 5 arrays, and/or RAID 6 arrays. It will be appreciated that various other types of RAID arrays may be used without departing from the scope of the present disclosure.

While in this particular example, computer 12 is shown to include five storage targets (e.g., storage targets 102, 104, 106, 108, 110), this is for example purposes only and is not intended limit the present disclosure. For instance, the actual number of storage targets may be increased or decreased depending upon, e.g., the level of redundancy/performance/capacity required.

Further, the storage targets (e.g., storage targets 102, 104, 106, 108, 110) included with computer 12 may be configured to form a plurality of discrete storage arrays. For instance, and assuming for example purposes only that computer 12 includes, e.g., ten discrete storage targets, a first five targets (of the ten storage targets) may be configured to form a first RAID array and a second five targets (of the ten storage targets) may be configured to form a second RAID array.

In some implementations, one or more of storage targets 102, 104, 106, 108, 110 may be configured to store coded data (e.g., via storage management process 21), wherein such coded data may allow for the regeneration of data lost/corrupted on one or more of storage targets 102, 104, 106, 108, 110. Examples of such coded data may include but is not limited to parity data and Reed-Solomon data. Such coded data may be distributed across all of storage targets 102, 104, 106, 108, 110 or may be stored within a specific storage target.

Examples of storage targets 102, 104, 106, 108, 110 may include one or more data arrays, wherein a combination of storage targets 102, 104, 106, 108, 110 (and any processing/control systems associated with storage management application 21) may form data array 112.

The manner in which computer 12 is implemented may vary depending upon e.g., the level of redundancy/performance/capacity required. For example, computer 12 may be configured as a SAN (i.e., a Storage Area Network), in which storage processor 100 may be, e.g., a dedicated computing system and each of storage targets 102, 104, 106, 108, 110 may be a RAID device. An example of storage processor 100 may include but is not limited to a VPLEX™, VNX™, TRIDENT™, or Unity™ system offered by Dell EMC™ of Hopkinton, MA.

In the example where computer 12 is configured as a SAN, the various components of computer 12 (e.g., storage processor 100, and storage targets 102, 104, 106, 108, 110) may be coupled using network infrastructure 114, examples of which may include but are not limited to an Ethernet (e.g., Layer 2 or Layer 3) network, a fiber channel network, an InfiniBand network, or any other circuit switched/packet switched network.

As discussed above, various I/O requests (e.g., I/O request 15) may be generated. For example, these I/O requests may be sent from, e.g., client applications 22, 24, 26, 28 to, e.g., computer 12. Additionally/alternatively (e.g., when storage processor 100 is configured as an application server or otherwise), these I/O requests may be internally generated within storage processor 100 (e.g., via storage management process 21). Examples of I/O request 15 may include but are not limited to data write request 116 (e.g., a request that content 118 be written to computer 12) and data read request 120 (e.g., a request that content 118 be read from computer 12).

In some implementations, during operation of storage processor 100, content 118 to be written to computer 12 may be received and/or processed by storage processor 100 (e.g., via storage management process 21). Additionally/alternatively (e.g., when storage processor 100 is configured as an application server or otherwise), content 118 to be written to computer 12 may be internally generated by storage processor 100 (e.g., via storage management process 21).

As discussed above, the instruction sets and subroutines of storage management application 21, which may be stored on storage device 16 included within computer 12, may be executed by one or more processors and one or more memory architectures included with computer 12. Accordingly, in addition to being executed on storage processor 100, some or all of the instruction sets and subroutines of storage management application 21 (and/or network sharing process 10) may be executed by one or more processors and one or more memory architectures included with data array 112.

In some implementations, storage processor 100 may include front end cache memory system 122. Examples of front end cache memory system 122 may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

In some implementations, storage processor 100 may initially store content 118 within front end cache memory system 122. Depending upon the manner in which front end cache memory system 122 is configured, storage processor 100 (e.g., via storage management process 21) may immediately write content 118 to data array 112 (e.g., if front end cache memory system 122 is configured as a write-through cache) or may subsequently write content 118 to data array 112 (e.g., if front end cache memory system 122 is configured as a write-back cache).

In some implementations, one or more of storage targets 102, 104, 106, 108, 110 may include a backend cache memory system. Examples of the backend cache memory system may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

Storage Targets:

As discussed above, one or more of storage targets 102, 104, 106, 108, 110 may be a RAID device. For instance, and referring also to FIG. 3, there is shown example target 150, wherein target 150 may be one example implementation of a RAID implementation of, e.g., storage target 102, storage target 104, storage target 106, storage target 108, and/or storage target 110. An example of target 150 may include but is not limited to a VPLEX™, VNX™, TRIDENT™, or Unity™ system offered by Dell EMC™ of Hopkinton, MA.

Examples of storage devices 154, 156, 158, 160, 162 may include one or more electro-mechanical hard disk drives, one or more solid-state/flash devices, and/or any of the above-noted storage devices. It will be appreciated that while the term "disk" or "drive" may be used throughout, these may refer to and be used interchangeably with any types of appropriate storage devices as the context and functionality of the storage device permits.

In some implementations, target 150 may include storage processor 152 and a plurality of storage devices (e.g., storage devices 154, 156, 158, 160, 162). Storage devices 154, 156, 158, 160, 162 may be configured to provide various levels of performance and/or high availability (e.g., via storage management process 21). For example, one or more of storage devices 154, 156, 158, 160, 162 (or any of the above-noted storage devices) may be configured as a RAID 0 array, in which data is striped across storage devices. By striping data across a plurality of storage devices, improved performance may be realized. However, RAID 0 arrays may not provide a level of high availability. Accordingly, one or more of storage devices 154, 156, 158, 160, 162 (or any of the above-noted storage devices) may be configured as a RAID 1 array, in which data is mirrored between storage devices. By mirroring data between storage devices, a level of high availability may be achieved as multiple copies of the data may be stored within storage devices 154, 156, 158, 160, 162.

While storage devices 154, 156, 158, 160, 162 are discussed above as being configured in a RAID 0 or RAID 1 array, this is for example purposes only and not intended to limit the present disclosure, as other configurations are possible. For example, storage devices 154, 156, 158, 160, 162 may be configured as a RAID 3, RAID 4, RAID 5 or RAID 6 array.

While in this particular example, target 150 is shown to include five storage devices (e.g., storage devices 154, 156, 158, 160, 162), this is for example purposes only and not intended to limit the present disclosure. For instance, the actual number of storage devices may be increased or decreased depending upon, e.g., the level of redundancy/ performance/capacity required.

In some implementations, one or more of storage devices 154, 156, 158, 160, 162 may be configured to store (e.g., via storage management process 21) coded data, wherein such coded data may allow for the regeneration of data lost/ corrupted on one or more of storage devices 154, 156, 158, 160, 162. Examples of such coded data may include but are not limited to parity data and Reed-Solomon data. Such coded data may be distributed across all of storage devices 154, 156, 158, 160, 162 or may be stored within a specific storage device.

The manner in which target 150 is implemented may vary depending upon e.g., the level of redundancy/performance/ capacity required. For example, target 150 may be a RAID device in which storage processor 152 is a RAID controller card and storage devices 154, 156, 158, 160, 162 are individual "hot-swappable" hard disk drives. Another example of target 150 may be a RAID system, examples of which may include but are not limited to an NAS (i.e., Network Attached Storage) device or a SAN (i.e., Storage Area Network).

In some implementations, storage target 150 may execute all or a portion of storage management application 21. The instruction sets and subroutines of storage management application 21, which may be stored on a storage device (e.g., storage device 164) coupled to storage processor 152, may be executed by one or more processors and one or more memory architectures included with storage processor 152. Storage device 164 may include but is not limited to any of the above-noted storage devices.

As discussed above, computer 12 may be configured as a SAN, wherein storage processor 100 may be a dedicated computing system and each of storage targets 102, 104, 106, 108, 110 may be a RAID device. Accordingly, when storage processor 100 processes data requests 116, 120, storage processor 100 (e.g., via storage management process 21) may provide the appropriate requests/content (e.g., write request 166, content 168 and read request 170) to, e.g., storage target 150 (which is representative of storage targets 102, 104, 106, 108 and/or 110).

In some implementations, during operation of storage processor 152, content 168 to be written to target 150 may be processed by storage processor 152 (e.g., via storage management process 21). Storage processor 152 may include cache memory system 172. Examples of cache memory system 172 may include but are not limited to a volatile, solid-state, cache memory system (e.g., a dynamic RAM cache memory system) and/or a non-volatile, solid-state, cache memory system (e.g., a flash-based, cache memory system). During operation of storage processor 152, content 168 to be written to target 150 may be received by storage processor 152 (e.g., via storage management process 21) and initially stored (e.g., via storage management process 21) within front end cache memory system 172.

There may be many storage solutions for a hyper-converged segment of a storage market that may get deployed in virtualized environments, such as vSphere from VMWare and Hyper-V from Microsoft. As compared to traditional IT infrastructure where storage, compute and networking are separate infrastructure components, potentially sold by separate vendors with interoperability and management challenges, hyper converged solutions are typically sold by a single vendor integrating storage, compute and networking into a single product and thereby avoiding interoperability issues and providing a consistent approach to infrastructure management.

Even though hyper-converged solutions may provide many benefits and cost savings to the customers through virtualization of storage, servers, networks and applications, these solutions may bring in ever-increasing demands on the network I/O infrastructure as well, which is to be more performant, reliable, efficient and cost-effective, than ever. An example storage system may be a scale out federation of highly-available two node appliances that may need to be deployed on top of, e.g., ESXi Hypervisor (or similar) and may support many technologies for host attachment such as, e.g., NVMe-oF and iSCSI (or similar). Even though such a storage system may serve storage to external hosts, like traditional non-virtualized storage arrays, it may allow many user applications or solutions (e.g., NSX or similar) to be co-located along with the storage system Controller virtual machine (VM) on the same host. Example storage systems may impose the following requirements on network I/O infrastructure in terms of high availability, reliability, efficiency, performance and cost: (1) high availability—no single point of failure in the network I/O infrastructure for various traffic types from, e.g., storage system Controller VM, ESXi and user VMs; (2) efficiency—as physical network port speeds are increasing to, e.g., 100G and beyond, efficient use of the network bandwidth and capability; (3) performance requirements—avoid overhead of, e.g., ESXi hypervisor for external hosts communicating with the storage system; (4) Controller VM—providing shortest look-back path between host VMs and storage system Controller VM—both running on top of, e.g., ESXi on the same node. The loopback path may be especially important for connectivity types such as, e.g., RoCEv2-based NVMe-oF (or similar) where ESXi does not support loopback within the kernel. Ability to provide quality of service (QoS)/bandwidth reservation for different traffic types from storage system Controller VM, ESXi and user VMs—to avoid noisy neighbor problems; (5) NSX-T (or similar) requirements—ability to use separate uplinks for NSX based virtual distributed switch(es) referred to as N-VDS. This is different from NSX-T's predecessor, NSX-V, because NSX-V does not require a separate virtual distributed switch (VDS) to be created for virtualized networks; (6) Network Adapter Restrictions—a single network adapter with multiple ports may not be partitioned across multiple operating systems or domains and therefore a need to be controlled from a single domain; (7) cost effectiveness—use minimum number of physical ports to satisfy the above-mentioned requirements—thereby requiring less cabling/network ports.

Some storage systems may use traditional VDS to share bandwidth of the underlying physical port between storage system Controller VM, ESXi and user VMs for management, storage, vMotion and user traffic. Some future storage systems may support (1) External and internal host connectivity with RoCEv2 based NVMe-oF, (2) NSX-T, and (3) Bypassing ESXi Hypervisor for external host. These features may introduce additional requirements, as mentioned above, that cannot generally be satisfied with the traditional VDS. As a result, the requirements for such a storage system may be solved using traditional VDS and without using device partitioning technologies and NIC switching.

As will be discussed below, network sharing process 10 may at least help, e.g., improve storage technology, necessarily rooted in computer technology in order to overcome an example and non-limiting problem specifically arising in the realm of computer storage networks, to improve existing technological processes associated with, e.g., being integrated into the practical application of storage system network device sharing. It will be appreciated that the computer processes described throughout are integrated into one or more practical applications, and when taken at least as a whole are not considered to be well-understood, routine, and conventional functions.

Figure 4:
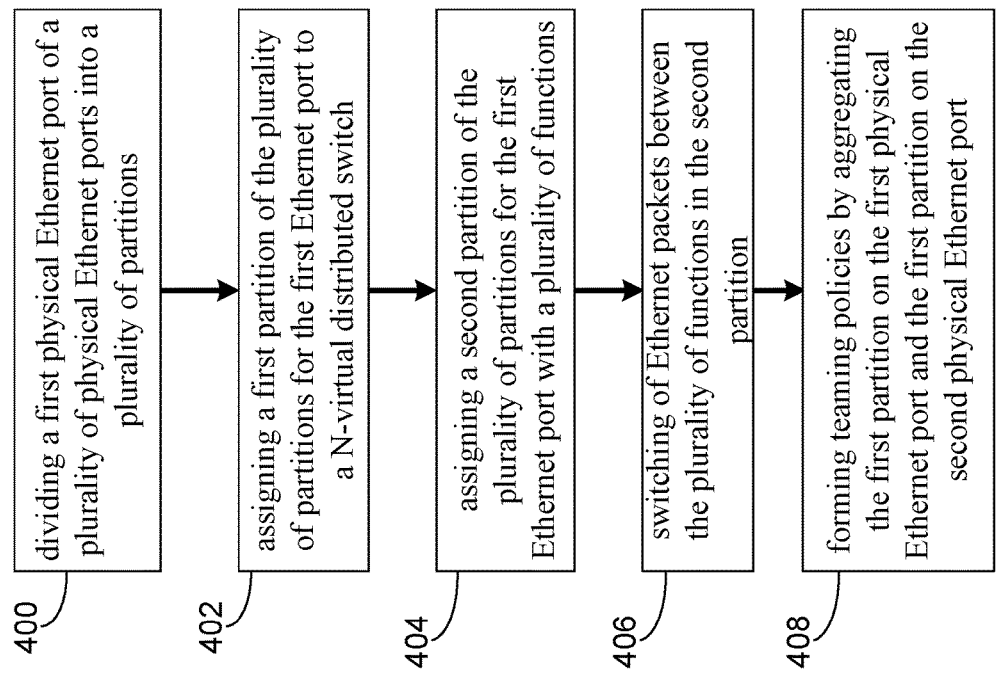
FIG. 4 is an example flowchart of a network sharing process according to one or more example implementations of the disclosure.
Figure 5:
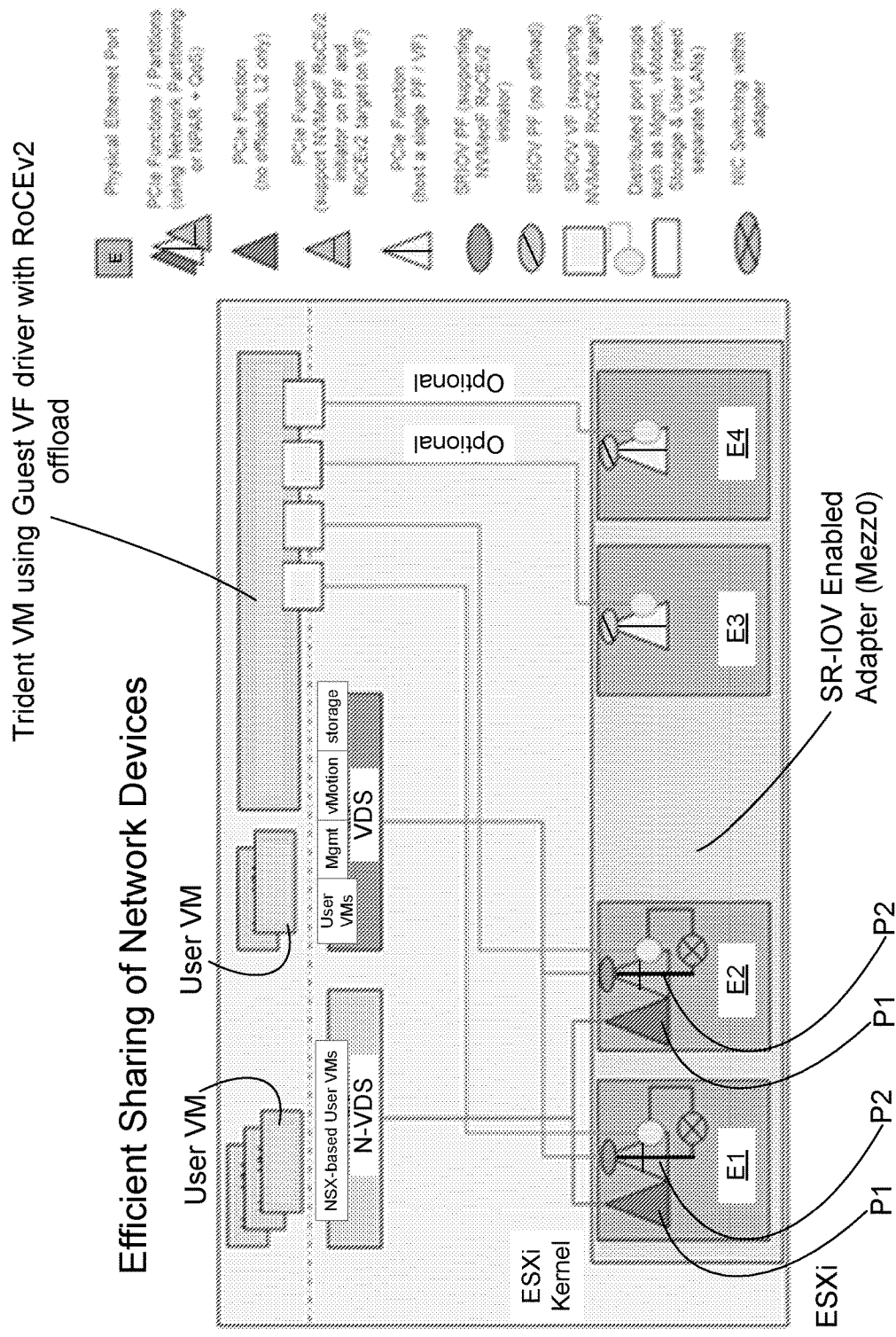
FIG. 5 is an example diagrammatic view of an example node of a storage application that may be used by a network sharing process according to one or more example implementations of the disclosure.

The Network Sharing Process:

As discussed above and referring also at least to the example implementations of FIGS. 4-5, network sharing process 10 may divide 400, by a computing device, a first physical Ethernet port of a plurality of physical Ethernet ports into a plurality of partitions. Network sharing process 10 may assign 402 a first partition of the plurality of partitions for the first Ethernet port to a N-virtual distributed switch. Network sharing process 10 may assign 404 a second partition of the plurality of partitions for the first Ethernet port with a plurality of functions. Network sharing process 10 may switch 406 Ethernet packets between the plurality of functions in the second partition.

As will be discussed below, the present disclosure may be built using network device partitioning and switching technologies to address storage system requirements on the network I/O infrastructure (e.g., in a hyper-converged environment). The technologies used in the present disclosure may include, e.g., (1) Network Device Partitioning Technologies and (2) Network Interface Card (NIC) Switching.

For network device partitioning technologies, NIC partitioning (or NPAR), may divide a single physical Ethernet port into multiple PCIe (or similar) functions or partitions with each of them having their own standard PCI (or similar) configuration space. Each of the partitions may be allocated bandwidth capacity (e.g., maximum limit or reservation or both) out of the total bandwidth capacity of the underlying physical Ethernet port. In some implementations, as will be discussed below, SR-IOV functions, such as a first function on a second partition and a second function on a second partition, may be single root IO virtualization functions created on a single root IO virtualization enabled adapter, and in some implementations, a first physical function of the plurality of functions on the second partition may be assigned to a virtual distributed switch (e.g., a standard or traditional virtual distributed switch, which is different from the above-noted N-virtual distributed switch), and a second virtual function of the plurality of functions on the second partition may be assigned to a controller virtual machine. For instance, Single Root IO Virtualization (SR-IOV) may be a specification from PCI special interest group (PCI-SIG) that allows a single physical Ethernet port to separate access to its resources among various PCIe functions, such as one or more PCIe Physical Functions (PF) and one or more PCIe Virtual Functions (VFs). PFs may generally be described as full-featured PCIe functions, whereas VFs may generally be described as lightweight functions that lack configuration resources but may move data in and out.

For NIC switching between PFs and their VFs, this may include switching of Ethernet packets between PFs and their VFs in the NIC hardware.

Referring at least to the example implementation of FIG. 5, an example node (e.g., node 500) is shown, where node 500 may be a single node of a storage application. Node 500 may include, but is not limited to a NPAR/SR-IOV enabled adapter, owned by ESXi, and may have four physical Ethernet ports, specifically E1, E2, E3 and E4 (although more or less ports may be included). In some implementations, the storage system controller may run as a VM on top of ESXi Hypervisor on this node. In some implementations, both NPAR and SR-IOV may be used simultaneously on the same physical Ethernet port along with NIC switching.

As noted above, in some implementations, network sharing process 10 may divide 400, by a computing device, a first physical Ethernet port of a plurality of physical Ethernet ports into a plurality of partitions. For example, a single physical Ethernet port may be divided 400 into multiple partitions using, e.g., NPAR, and each partition may be allocated some bandwidth capacity. This bandwidth allocation entitles a partition for the reserved bandwidth capacity irrespective of bandwidth demand from the peer partition(s), thus avoiding noisy neighbor problems. Moreover, the partition may use additional bandwidth over and beyond the reserved bandwidth if the peer partition(s) are not consuming their share of reserved bandwidth. As can be seen in FIG. 5, physical Ethernet port E1 is divided into two partitions, P1 and P2. It will be appreciated that more (or less) partitions may be used per physical Ethernet port.

In some implementations, network sharing process 10 may assign 402 a first partition of the plurality of partitions for the first Ethernet port to a N-virtual distributed switch. For example, networking sharing process 10 may assign 402 one of the partitions of the physical Ethernet port to N-VDS. Since each partition is a PCIe function, assigning a partition to N-VDS satisfies the requirement of a separate uplink for N-VDS. As can be seen in FIG. 5, $1^{st}$ partition (P1) of physical Ethernet port E1 is assigned to N-VDS.

In some implementations, network sharing process 10 may assign 404 a second partition of the plurality of partitions for the first Ethernet port with a plurality of functions. For example, as noted above, the resources of another partition of the physical Ethernet port may be further separated using, e.g., SR-IOV, into a full-featured PF and a lightweight VF. The full-featured PF may be assigned 404 to traditional VDS and lightweight VF may be assigned 404 to the storage system controller VM. As shown in FIG. 5, $2^{nd}$ partition (P2) of physical Ethernet port E1 may be divided into a PF, which is assigned to VDS, and a VF, which is assigned to the storage system controller VM. This may achieve one or more objectives.

For example, in some implementations, network sharing process 10 may switch 406 Ethernet packets between the plurality of functions in the second partition, and a loopback capability may be provided between the physical function and the virtual function of the second partition. Such a loopback capability between PF and its VF, is not generally provided by ESXi Kernel for NVMe-oF using RoCEv2 and therefore reduces latency for host VMs in accessing storage from the storage system controller VM. The loopback capability may utilize the above-noted NIC switching 406.

As another example objective, the present disclosure may avoid ESXi hypervisor overhead for external hosts communicating to the storage system controller VM using VF and thus provides better latency. As yet another example objective, ESXi may use PF as an uplink for traditional VDS and may provide network connectivity for management, vMotion, storage and user traffic, like some storage systems. In some implementations, bandwidth allocation for the second partition may be subdivided between the physical function and the virtual function. For instance, as yet another example objective, the bandwidth allocation for the $2^{nd}$ partition may be further sub-divided between PF and its VF to guarantee bandwidth for ESXi and storage system controller VM. As yet another example objective, any other partitions created from the same physical Ethernet port may be used for other purposes, if desired. As shown in FIG. 5, only two partitions, P1 and P2, are created of the physical Ethernet port E1.

In some implementations, network sharing process 10 may form 408 teaming policies by aggregating the first partition on the first physical Ethernet port and the first partition on the second physical Ethernet port, and in some implementations, a symmetric configuration of the first physical Ethernet port may be created on a second physical Ethernet port of the plurality of physical Ethernet ports. For example, to avoid single point of failure for various traffic types running over the partitions of a physical Ethernet port, a symmetric configuration may be created on one or more additional physical Ethernet ports, in terms of number of partitions, PF/VF, bandwidth allocation/QoS. As shown in FIG. 5, two partitions, P1 and P2, are created for the physical Ethernet port E2, where the partition P2 is further separated into a PF and a VF, like the configuration of the physical Ethernet port E1. The partitions, PFs, and VFs on these two physical Ethernet ports E1 and E2, may be aggregated to form 408 example teaming policies as follows:

(1) $1^{st}$ partition, P1, from the $1^{st}$ physical Ethernet port E1, and $1^{st}$ partition, P1, from the $2^{nd}$ physical Ethernet port E2, may be assigned as uplinks to N-VDS. N-VDS (e.g., via network sharing process 10) may create a teaming policy on top of these two partitions.

(2) Using the PF of the $2^{nd}$ partition from the $1^{st}$ physical Ethernet port E1, and PF of the $2^{nd}$ partition from the $2^{nd}$ physical Ethernet port E2, they may be assigned as uplinks to traditional VDS. VDS (e.g., via network sharing process 10) may create a teaming policy on top of these two PFs for management, vMotion and user traffic, whereas port binding may be created for storage traffic to enable multi-pathing.

(3) The VF of the $2^{nd}$ partition from the $1^{st}$ physical Ethernet port E1, and VF of the $2^{nd}$ partition from the $2^{nd}$ physical Ethernet port E2 may be assigned to the storage system controller VM, but the VFs are not teamed together in this example. Each VF may be a unique RoCEv2 NVMe-oF (or similar) target and NVMe multi-pathing may be used to avoid a single point of failure.

The present disclosure may use only two physical Ethernet ports to satisfy all the requirements of some hyper converged storage system environments and thereby avoid the need for extra cabling and switch ports. If the network adapter has more than two physical Ethernet ports, then extra network ports may be connected to the storage system controller VM using, e.g., SR-IOV VFs, if desired. In some implementations, a single network adapter may not be controlled from two different domains (e.g., ESXi and the storage system controller VM) and therefore neither physical Ethernet port(s) nor partitions may be allocated to the storage system controller VM directly.

It will be appreciated that while example storage systems are described (e.g., Trident, TridentX, etc.) and example hyper converged environments are described, any appropriate storage system and/or hyper converged environment may be used without departing from the scope of the present disclosure. As such, the example storage systems and hyper converged environments should be taken as example only and not to otherwise limit the scope of the present disclosure.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method for dividing a physical Ethernet port, comprising:
dividing, by a computing device, a first physical Ethernet port of a plurality of physical Ethernet ports into a plurality of partitions using NIC partitioning;
assigning a first partition of the plurality of partitions for the first Ethernet port to a N-virtual distributed switch;
assigning a second partition of the plurality of partitions for the first Ethernet port with a plurality of functions using single root IO virtualization;
switching of Ethernet packets between a physical function and a virtual function of the plurality of functions in the second partition;
wherein dividing the physical Ethernet port includes simultaneously using NIC partitioning and single root IO virtualization on the physical Ethernet port;
creating a symmetric configuration of the first physical Ethernet port on a second physical Ethernet port of the plurality of Ethernet ports; and
forming teaming policies by aggregating the first physical Ethernet port and the second physical Ethernet port, the teaming policy including:
assigning the first partition of the first physical Ethernet port and a first partition of the second physical Ethernet port as uplinks to the N-virtual distributed switch;
using the physical function of the second partition of the first physical Ethernet port and a physical function of a second partition of the second physical Ethernet port for management, vMotion, and user traffic, and creating port binding for storage traffic to enable multi-pathing; and
assigning the virtual function of the second partition of the first physical Ethernet port and a virtual function of the second partition of the second physical Ethernet port to a storage system controller virtual machine, wherein the virtual function of the second partition of the first physical Ethernet port and the virtual function of the second partition of the second physical Ethernet port are not teamed together.

2. The computer-implemented method of claim 1 wherein a first function of the plurality of functions on the second partition is the physical function and is assigned to a virtual distributed switch, and wherein a second function of the plurality of functions on the second partition is the virtual function and is assigned to a controller virtual machine.

3. The computer-implemented method of claim 2 wherein the physical function on the second partition and the virtual function on the second partition are single root IO virtualization functions created on a single root IO virtualization enabled adapter.

4. The computer-implemented method of claim 3 wherein a loopback capability is provided between the physical function and the virtual function of the second partition.

5. The computer-implemented method of claim 3 wherein bandwidth allocation for the second partition is subdivided between the physical function and the virtual function.

6. A computer program product residing on a non-transitory computer readable storage medium having a plurality of instructions stored thereon which, when executed across one or more processors, causes at least a portion of the one or more processors to perform operations comprising:
dividing a first physical Ethernet port of a plurality of physical Ethernet ports into a plurality of partitions using NIC partitioning;
assigning a first partition of the plurality of partitions for the first Ethernet port to a N-virtual distributed switch;
assigning a second partition of the plurality of partitions for the first Ethernet port with a plurality of functions using single root IO virtualization;
switching of Ethernet packets between a physical function and a virtual function of the plurality of functions in the second partition;
wherein dividing the physical Ethernet port includes simultaneously using NIC partitioning and single root IO virtualization on the physical Ethernet port;
creating a symmetric configuration of the first physical Ethernet port on a second physical Ethernet port of the plurality of Ethernet ports; and
forming teaming policies by aggregating the first physical Ethernet port and the second physical Ethernet port, the teaming policy including:
assigning the first partition of the first physical Ethernet port and a first partition of the second physical Ethernet port as uplinks to the N-virtual distributed switch;
using the physical function of the second partition of the first physical Ethernet port and a physical function of a second partition of the second physical Ethernet port for management, vMotion, and user traffic, and creating port binding for storage traffic to enable multi-pathing; and
assigning the virtual function of the second partition of the first physical Ethernet port and a virtual function of the second partition of the second physical Ethernet port to a storage system controller virtual machine, wherein the virtual function of the second partition of the first physical Ethernet port and the virtual function of the second partition of the second physical Ethernet port are not teamed together.

7. The computer program product of claim 6 wherein a first function of the plurality of functions on the second partition is the physical function and is assigned to a virtual distributed switch, and wherein a second function of the plurality of functions on the second partition is the virtual function and is assigned to a controller virtual machine.

8. The computer program product of claim 7 wherein the physical function on the second partition and the virtual function on the second partition are single root IO virtualization functions created on a single root IO virtualization enabled adapter.

9. The computer program product of claim 8 wherein a loopback capability is provided between the physical function and the virtual function of the second partition.

10. The computer program product of claim 8 wherein bandwidth allocation for the second partition is subdivided between the physical function and the virtual function.

11. A computing system including one or more processors and one or more memories configured to perform operations comprising:
dividing a first physical Ethernet port of a plurality of physical Ethernet ports into a plurality of partitions using NIC partitioning;
assigning a first partition of the plurality of partitions for the first Ethernet port to a N-virtual distributed switch;
assigning a second partition of the plurality of partitions for the first Ethernet port with a plurality of functions using single root IO virtualization;

switching of Ethernet packets between a physical function and a virtual function of the plurality of functions in the second partition;

wherein dividing the physical Ethernet port includes simultaneously using NIC partitioning and single root IO virtualization on the physical Ethernet port;

creating a symmetric configuration of the first physical Ethernet port on a second physical Ethernet port of the plurality of Ethernet ports; and forming teaming policies by aggregating the first physical Ethernet port and the second physical Ethernet port, the teaming policy including:

assigning the first partition of the first physical Ethernet port and a first partition of the second physical Ethernet port as uplinks to the N-virtual distributed switch;

using the physical function of the second partition of the first physical Ethernet port and a physical function of a second partition of the second physical Ethernet port for management, vMotion, and user traffic, and creating port binding for storage traffic to enable multi-pathing; and assigning the virtual function of the second partition of the first physical Ethernet port and a virtual function of the second partition of the second physical Ethernet port to a storage system controller virtual machine, wherein the virtual function of the second partition of the first physical Ethernet port and the virtual function of the second partition of the second physical Ethernet port are not teamed together.

12. The computing system of claim 11 wherein a first function of the plurality of functions on the second partition is the physical function and is assigned to a virtual distributed switch, and wherein a second function of the plurality of functions on the second partition is the virtual function and is assigned to a controller virtual machine.

13. The computing system of claim 12 wherein the physical function on the second partition and the virtual function on the second partition are single root IO virtualization functions created on a single root IO virtualization enabled adapter.

14. The computing system of claim 13 wherein a loopback capability is provided between the physical function and the virtual function of the second partition.

15. The computing system of claim 13 wherein bandwidth allocation for the second partition is subdivided between the physical function and the virtual function.

* * * * *